June 14, 1955  J. A. McCORMICK  2,710,676
RAILWAY TRUCK STRUCTURE
Filed Dec. 15, 1949  4 Sheets-Sheet 1
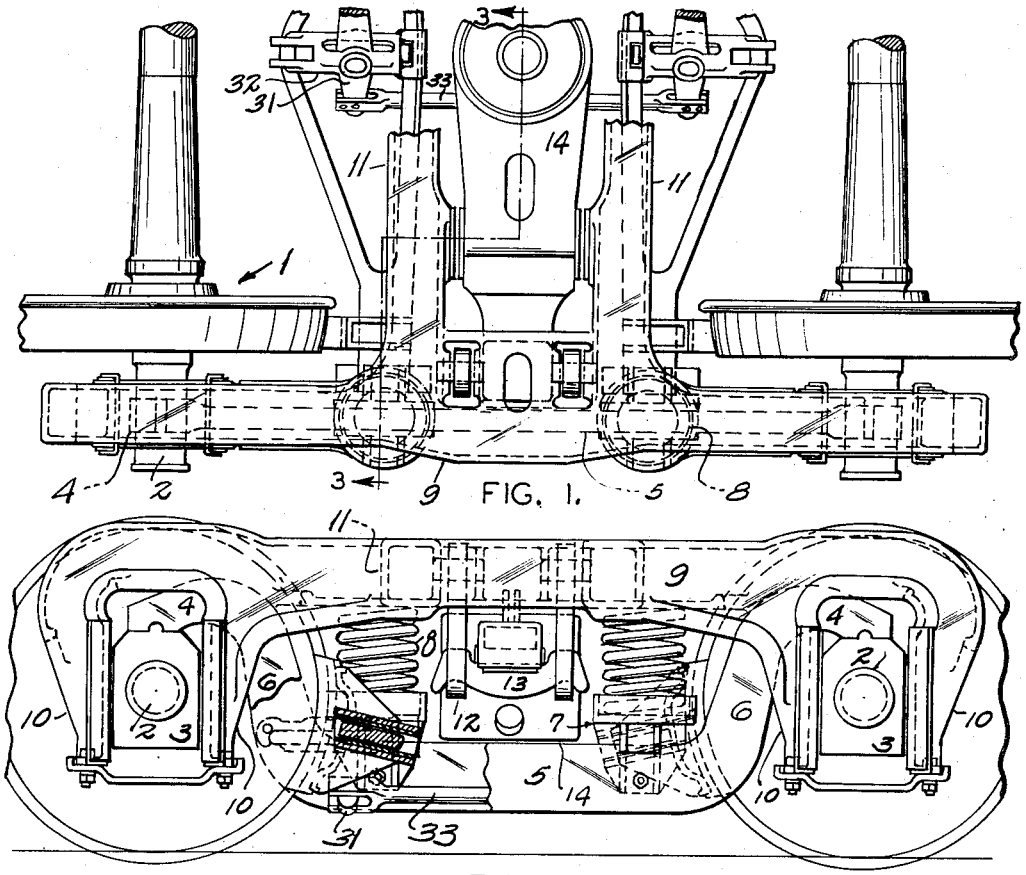
FIG. 1.
FIG. 2.
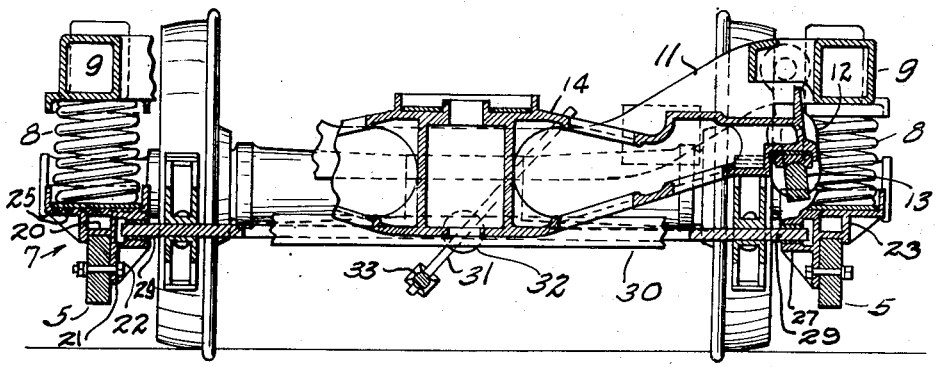
FIG. 3.
INVENTOR
John A. McCormick
BY Rodney Bedell
ATTY.

June 14, 1955     J. A. McCORMICK     2,710,676
RAILWAY TRUCK STRUCTURE
Filed Dec. 15, 1949     4 Sheets-Sheet 2

INVENTOR
John A. McCormick
By Rodney Bedell
ATTY.

June 14, 1955 J. A. McCORMICK 2,710,676
RAILWAY TRUCK STRUCTURE
Filed Dec. 15, 1949. 4 Sheets-Sheet 3

INVENTOR
John A. McCormick
By Rodney Bedell
ATTY.

June 14, 1955  J. A. McCORMICK  2,710,676
RAILWAY TRUCK STRUCTURE
Filed Dec. 15, 1949  4 Sheets-Sheet 4

INVENTOR
John A. McCormick
By Rodney Bedell
ATTY.

United States Patent Office 2,710,676
Patented June 14, 1955

2,710,676

RAILWAY TRUCK STRUCTURE

John A. McCormick, Evanston, Ill., assignor to General Steel Castings Corporation, Granite City, Ill., a corporation of Delaware Application December 15, 1949, Serial No. 133,118

7 Claims. (Cl. 188—212)

The invention relates to railway rolling stock and more particularly to trucks of passenger train type in which equalizing bars extend between spaced wheel and axle assemblies and mount springs spaced longitudinally of the truck which carry the truck frame which in turn is provided with means for supporting the truck bolster for movement transversely of the frame.

The invention consists in providing, in such a truck, supports for slidably mounting the brake beams on the equalizers.

One object of the invention is to adapt a truck of this type for slidably mounting the brake beams.

Another object is to associate the equalizer, spring seat and brake beam support elements in such manner that it will not be necessary to increase the truck wheel base over what would be required for the ordinary short wheel base passenger train truck in which the brake beams are supported by swinging hangers from the upper portion of the truck frame.

Another object is to adapt the equalizers of such a truck for sliding brakes of the "clasp" class engaging the wheels at diametrically opposite points.

These and other detail objects of the invention as will be obvious to those skilled in the art will appear from the following illustrations, in which:

Figure 1 is a top view of one longitudinal half of a passenger train four-wheel truck of the type referred to above.

Figure 2 is a side elevation of the same.

Figure 3 is a vertical transverse section taken on the line 3—3 of Figure 1, the right hand side of the section extending to the opposite side of the truck.

Figure 8:
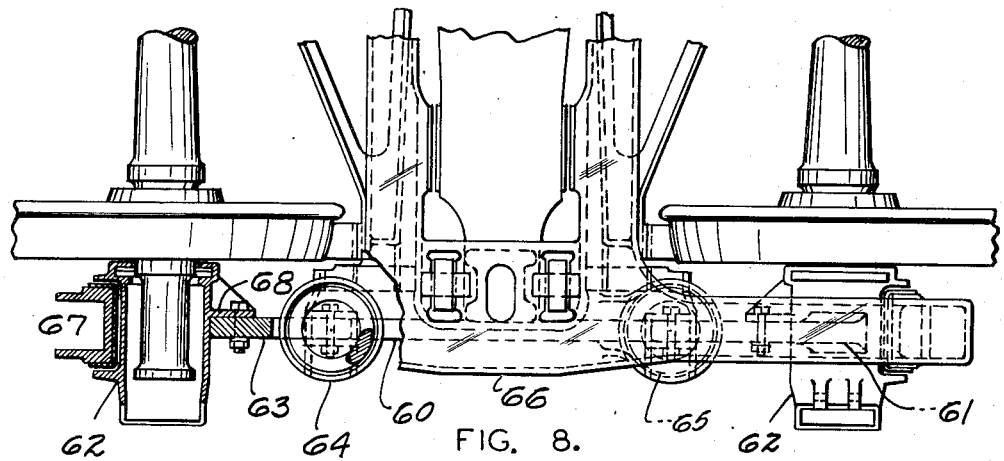
Figure 9:
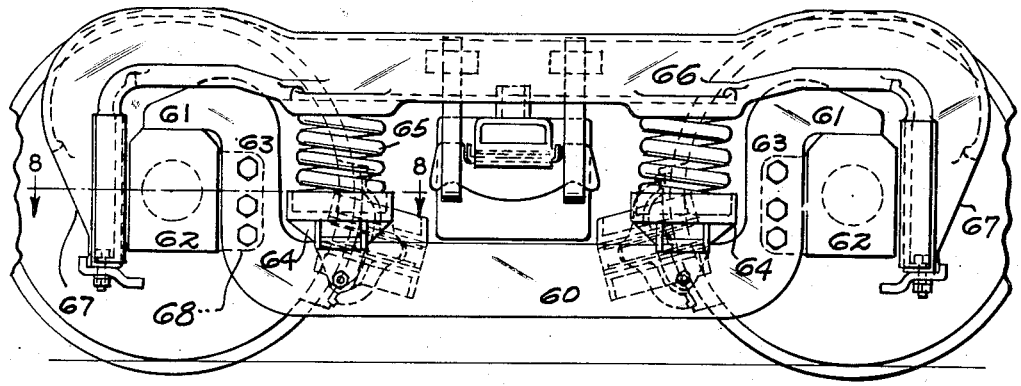

Figures 8 and 9 correspond to Figures 1 and 2 but illustrate another form of the invention, a portion of the journal box and associated structure in Figure 8 being sectioned horizontally on line 8—8 of Figure 9.

Figure 5:
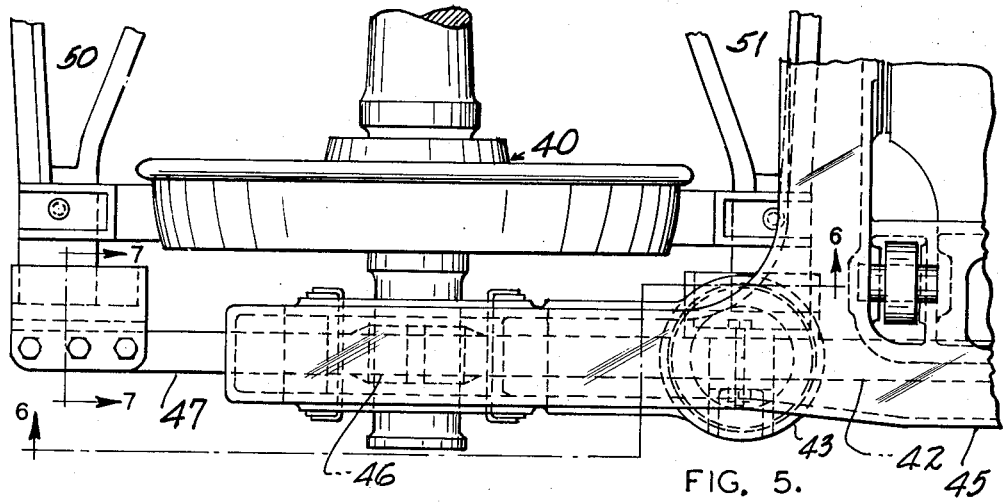
Figure 5 is a top view of one corner of a modified truck structure.
Figure 6:
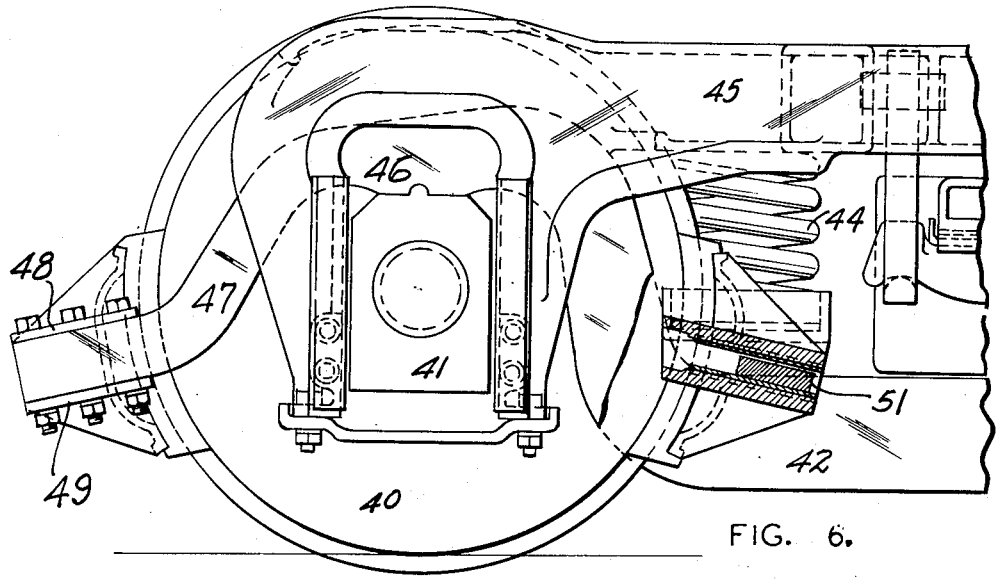
Figure 6 is a side elevation of the same with a portion of the beam and support brackets shown in section on the line 6—6 of Figure 5.
Figure 10:
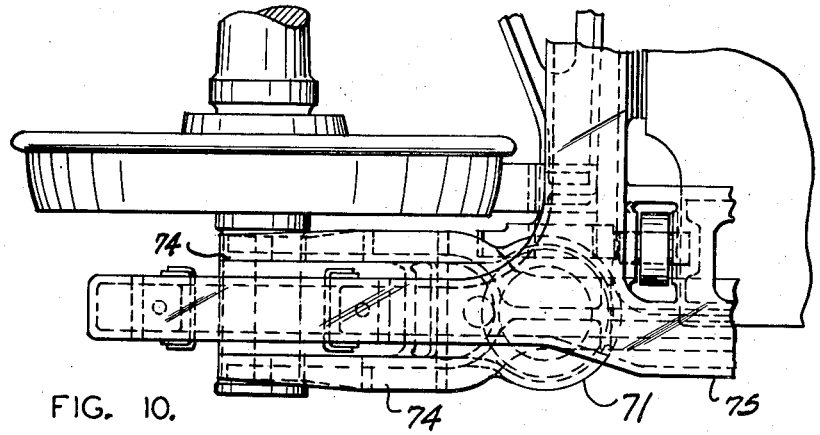
Figure 11:
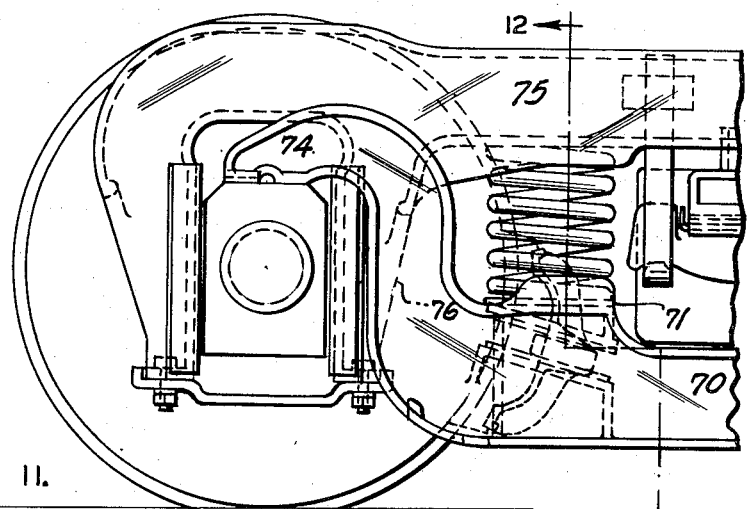

Figures 10 and 11 correspond to Figures 5 and 6 but illustrate another form of the invention.

Figure 12:
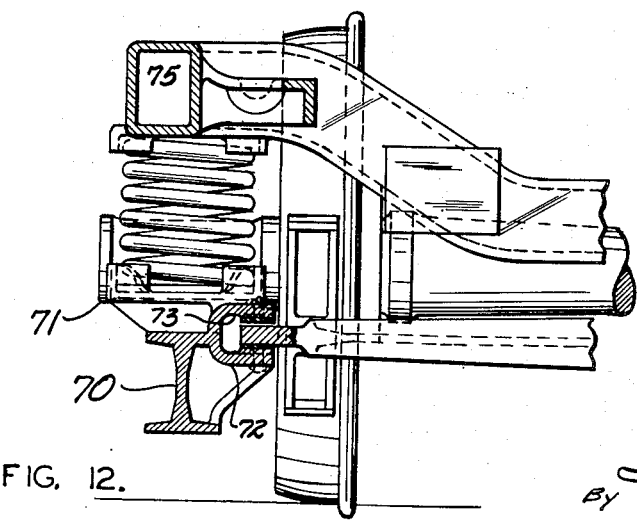

Figure 12 is a transverse section taken on the line 12—12 of Figure 11.

Figure 4:
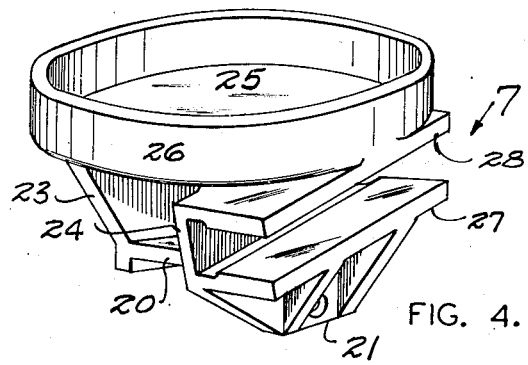
Figure 4 is a perspective of the unit comprising the truck spring seat and the brake beam support bracket.

The truck shown in Figures 1-4 includes the usual wheel and axle assemblies 1 with the axles terminating in journals 2 mounting journal boxes 3. An equalizer extends between journal boxes 3 at the same side of the truck and has elevated end portions 4 resting upon the boxes, a drop middle portion 5, and upright portions 6 connecting portions 4 and 5. Two brackets 7, detailed in Figure 4, are mounted upon the middle portion 5 of each equalizer near the junction of equalizer portions 5 and 6 and are spaced apart a substantial distance longitudinally of the truck. Each bracket forms a seat for a spring unit 8. The truck frame includes wheel pieces 9 resting on spring units 8 and having a pair of depending pedestal legs 10 at each end slidably receiving the associated journal boxes 3. The frame includes spaced transverse transoms 11.

Two swing hangers 12 are pivotally suspended from each side of the frame, being spaced apart longitudinally of the truck a less distance than brackets 7 and mounting a cross bar 13. A truck bolster 14 extends across the truck between transoms 11 with its ends supported upon cross bars 13 either directly or by means of yielding supports.

Each bracket 7 (Figures 3, 4) includes a base 20, resting upon the top surface of the equalizer middle portion 5, and a depending leg 21 engaging the side of the equalizer by which the bracket may be bolted at 22 to the equalizer.

Webs 23 and 24 extend upwardly from base 20 and are connected at their upper ends by a disc 25 which forms a spring seat and is surrounded by a spring retaining flange 26. Ribs 27 and 28 extend inwardly from web 24 and form elongated flat surfaces inclined to the horizontal longitudinally of the truck and spaced vertically of the truck to receive between them the wide flat end 29 of the associated brake beam 30 to support the latter and guide it in its movement towards and from the wheels as the brakes are applied and released.

With this arrangement, the brake beams are slidably supported from the equalizers at points adjacent but below the truck springs which are mounted as close to the journal boxes as possible with the type of equalizer shown, thus effecting maximum equalization of the truck springs and avoiding interference of the truck springs with the bolster supporting swing hangers as the latter swing from the normal position, indicated in Figure 3, to one side or the other of the truck under lateral thrusts, all without increasing the truck wheel base beyond what would be required for this type of truck assembly if the brake beams were suported by brackets from the truck frame at points adjacent to the swing hanger supports in the usual manner.

Each beam is readily applied to the truck by movement longitudinally of the truck into the space between ribs 27 and 28 and is retained in position on its supports by the brake lever 31 connected to the beam strut 32 and positioned longitudinally of the truck by the pivoting of its lower end to the brake bottom connection 33 and the pivoting of its upper end to the truck frame or other brake rod (not shown) as the case may be.

Figure 7:
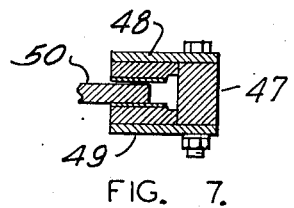
Figure 7 is a detailed vertical transverse section taken on the line 7—7 of Figure 5.

Figures 5, 6 and 7 show another arrangement which embodies the truck structure as previously described including wheel and axle assemblies 40, journal boxes 41, equalizers 42, spring seat and brake beam support brackets 43, truck springs 44 and truck frame 45. The elevated end portion 46 of each equalizer is extended longitudinally of the truck and downwardly as indicated at 47 and is there inclined and shaped to mount inwardly extending support and guide elements 48 and 49 for receiving between them the ends of a brake beam 50 positioned outwardly of the truck from the wheels and forming with brake beam 51 a clasp brake arrangement for the wheel and axle assembly.

Figures 8 and 9 illustrate another form of the invention in which the equalizer has a middle portion 60, elevated end portions 61, resting upon journal boxes 62, and upright portions 63 connecting portions 60 and 61. The spring seat and brake beam bracket structures 64 correspond to those previously described. Springs 65 mounted on the spring seats support the truck frame 66 which has a single depending pedestal leg 67 at each end extending along the outer side of the journal box. The inner side of the journal box is flanged at 68 and is bolted direct to the equalizer portion 63.

With this arrangement, inner pedestal legs are unnecessary and the equalizer middle portion 60 may extend closer to the journal boxes and accordingly, the bracket 64 and springs 65 may be positioned closer to the journal boxes than in the form previously described which is advantageous in a short wheel base truck.

Figures 10, 11 and 12 show another form of the invention characterized by the equalizer 70 with the spring seat 71 and brake beam support and guide elements 72 and 73 all formed integrally in a one-piece casting, the lower middle portion of the equalizer being of I cross section (Figure 12) while the upper and elevated end portions 74 consist of elements of channel cross section and spaced apart transversely of the truck with their lower ends merging with the I section middle portions. The truck frame 75 corresponds to the embodiment shown in Figures 1–6 but the inner depending leg 76, instead of straddling the adjacent portion of the equalizer, extends between equalizer portions 74.

This arrangement also facilitates maximum spacing of the truck springs longitudinally of the truck for a given wheel base.

Each form of the invention accommodates the assembly of the truck frame supporting springs and brake beam support and guide elements in the same general transverse plane to clear the bolster, which extends transversely of the truck between the truck springs and brake beams, without elongating the truck wheel base because of the use of beams of the type shown which are slidably supported at their ends from the equalizers.

The details of the construction may be varied without departing from the spirit of the invention and the exclusive use of those modifications coming within the scope of the claims is contemplated.

What is claimed is:

1. As a new article of manufacture, a device for application to a railway truck equalizer comprising an upright web for application to an upright face of the equalizer, an upwardly facing shallow cup-like spring seat member projecting laterally from the upper portion of said web, and an open ended bracket including a substantially flat rib projecting laterally from said web beneath and spaced below said cup-like member and inclined to the vertical longitudinally of said web and arranged for slidable support of one end of a brake beam.

2. As a new article of manufacture, a device for application to a railway truck equalizer comprising an upright web for application to an upright face of the equalizer, an upwardly facing shallow cup-like spring seat member projecting laterally from the upper portion of said web, and an open ended bracket including a substantially flat rib projecting laterally from said web beneath and spaced from said cup-like member and inclined to the horizontal longitudinally of said web and arranged for slidable support of one end of a brake beam, there being a beam guide flange above said rib and beneath said cup member.

3. A brake arrangement for a railway truck including spaced wheel and axle assemblies with an equalizer extending between and supported thereon and provided with spring seats near the treads of the corresponding wheels, said brake arrangement comprising a support projecting from the equalizer beneath each seat, and having an upwardly facing surface elongated lengthwise of the equalizer, and a brake beam extending transversely of the equalizer and having a head and shoe near the equalizer and facing lengthwise of the equalizer, and the end of the beam projecting beyond the head and shoe and supported on said support surface and slidable thereon lengthwise of the equalizer whereby the shoe may be moved towards and away from a wheel tread.

4. In a brake arrangement for a railway truck having spaced wheel and axle assemblies, as defined in and by claim 3 wherein the equalizer extends between said assemblies and includes a middle portion of I shaped cross section, below the level of the axles, and end portions with bifurcations spaced apart transversely of the truck and merging with said intermediate portion and extending along the side and over the top of the associated journal box, elements projecting upwardly and transversely from said middle portion and forming said brake beam support, extending longitudinally of the truck in substantial alignment with one of said bifurcations, and forming said spring seats above said support, springs mounted on said spring seats, and a truck frame carried on said springs with depending pedestal legs slidably receiving said journal boxes, at least one leg adjacent each box extending between the laterally spaced bifurcations of the equalizer.

5. A brake arrangement as defined in and by claim 4 wherein there is an element which projects transversely from the equalizer above the brake beam support and below the spring seat and cooperates with the support to guide the brake beam.

6. A brake arrangement for a railway truck including spaced wheel and axle assemblies with an equalizer extending between and supported thereon and mounting springs near the treads of adjacent wheels and a truck frame including wheel pieces mounted on the springs, there being bolster-supporting hangers suspended from the wheel pieces to swing laterally of the truck and positioned outboard of the plane of the wheels and inboard of the frame wheel pieces, said arrangement comprising a bracket projecting from the equalizer beneath each spring and between the corresponding wheel tread and the adjacent hanger and having an upwardly facing surface extending longitudinally of the equalizer, and a brake beam extending transversely of the truck and having a head and shoe near its end facing lengthwise of the equalizer, the end of the beam projecting beyond the head and shoe and supported on said bracket surface and slidable thereon lengthwise of the equalizer whereby the shoe may be moved towards and away from the wheel tread.

7. As a new article of manufacture, a spring seat support and brake beam support comprising a horizontal ledge having a downwardly facing surface shaped for application to the top of a railway truck equalizer, an upwardly facing pan-like part adapted to receive the lower end of a helical truck spring, and an elongated ledge having an upwardly facing surface inclined to the horizontal and projecting laterally from one side of said horizontal ledge and below said pan-like part and adapted to slidably support the end of a brake beam.

References Cited in the file of this patent

UNITED STATES PATENTS

| | | |
|---|---|---|
| 414,575 | Pfingst et al. | Nov. 5, 1889 |
| 431,075 | Pfingst et al. | July 1, 1890 |
| 711,899 | Johnson et al. | Oct. 21, 1902 |
| 1,028,386 | Price | June 4, 1912 |
| 1,936,392 | Hedgecock | Nov. 21, 1933 |
| 2,269,618 | Busch | Jan. 13, 1942 |
| 2,296,769 | Cox | Sept. 22, 1942 |
| 2,343,940 | Tack | Mar. 14, 1944 |
| 2,394,232 | Cottrell | Feb. 5, 1946 |
| 2,419,473 | Travilla | Apr. 22, 1947 |
| 2,433,582 | Tack e al. | Dec. 30, 1947 |
| 2,490,581 | Couch | Dec. 6, 1949 |